(12) United States Patent
Shoemake et al.

(10) Patent No.: US 9,086,610 B2
(45) Date of Patent: Jul. 21, 2015

(54) ILLUMINATION DEVICE

(71) Applicants: Allan Shoemake, Boonton, NJ (US);
William Winter, Boonton, NJ (US);
Juan Fernandez, Towaco, NJ (US);
Paul McGrath, Flanders, NJ (US)

(72) Inventors: Allan Shoemake, Boonton, NJ (US);
William Winter, Boonton, NJ (US);
Juan Fernandez, Towaco, NJ (US);
Paul McGrath, Flanders, NJ (US)

(73) Assignee: GLOW ENTERPRISES, LLC,
Boonton, NJ (US)

( * ) Notice: Subject to any disclaimer, the term of this patent is extended or adjusted under 35 U.S.C. 154(b) by 0 days.

(21) Appl. No.: 13/758,212

(22) Filed: Feb. 4, 2013

(65) Prior Publication Data

US 2013/0201653 A1    Aug. 8, 2013

Related U.S. Application Data

(60) Provisional application No. 61/594,653, filed on Feb. 3, 2012.

(51) Int. Cl.
| | |
|---|---|
| *G03B 15/02* | (2006.01) |
| *F21V 21/00* | (2006.01) |
| *G06F 1/16* | (2006.01) |
| *H04N 7/14* | (2006.01) |
| *H04M 1/22* | (2006.01) |

(52) U.S. Cl.
CPC ............... *G03B 15/02* (2013.01); *F21V 21/00* (2013.01); *G06F 1/1626* (2013.01); *G06F 1/1632* (2013.01); *H04M 1/22* (2013.01); *H04N 7/142* (2013.01)

(58) Field of Classification Search
CPC ................................ G03B 15/02; F21V 21/00
See application file for complete search history.

(56) References Cited

U.S. PATENT DOCUMENTS

| | | | |
|---|---|---|---|
| 7,631,979 B1 | 12/2009 | Brown et al. | |
| 7,841,729 B2 | 11/2010 | Geddes | |
| 7,893,953 B2 | 2/2011 | Krestakos et al. | |
| 7,969,505 B2 | 6/2011 | Saito | |
| 8,022,977 B2 | 9/2011 | Kanade | |
| 2008/0122821 A1 | 5/2008 | Nilsson et al. | |
| 2009/0174759 A1 | 7/2009 | Yeh et al. | |
| 2010/0321467 A1 | 12/2010 | Goodman | |
| 2011/0228096 A1 | 9/2011 | Friel et al. | |
| 2012/0302294 A1 | 11/2012 | Hammond et al. | |
| 2014/0055978 A1* | 2/2014 | Gantz et al. | 362/8 |

FOREIGN PATENT DOCUMENTS

EP          0 738 080 B1    11/1999

\* cited by examiner

*Primary Examiner* — Elmito Breval
(74) *Attorney, Agent, or Firm* — Gearhart Law, LLC

(57) ABSTRACT

The current invention discloses an illumination device that may be attached to a computing device and provide a light source for a video call, video conference, or a picture capturing process. The illumination device comprises a light source, a power connector, and an attachment assembly that connects that light source to the computing device. The light source maybe a plurality of LEDs or a light panel using electroluminescent lighting. The illumination device may further comprise an external power source and a switch. The illumination device may also be integrally connected to the computing device and uses the power source of the computing device and being controlled by buttons or switches of the computing device. The illumination device may also provide additional signals for incoming calls or ongoing calls by displaying different light intensity, pattern, or color.

30 Claims, 5 Drawing Sheets

ILLUMINATION DEVICE

CLAIM OF PRIORITY

This utility application claims priority from U.S. provisional application 61/594,653, filed on Feb. 3, 2012, the contents of which are herein fully incorporated by reference.

FIELD OF THE INVENTION

The invention relates to an illumination device, and more particularly to an illumination device attached to a computing device, especially a handheld computing device such as a smart phone, to facilitate video calls, teleconferences, other camera-related processes, and other applications conducted with the computing device requiring optimized illumination.

BACKGROUND OF THE INVENTION

Computing devices, especially handheld computing devices, have undergone explosive development in the past two decades. Here, computing devices refer to but are not limited to: desktop computers, laptop computers, and handheld computing devices such as but not limited to smart phones such as iPhones® or Android® phones, computing tablets such as iPAD®,Personal Data Assistants (PDAs), and other devices that are relatively small and light and are equipped with basic computing and internet connecting capabilities. Computing devices are playing more and more significant roles in people's work, entertainment, and communications.

Most of the computing devices nowadays are equipped with cameras. In many cases, especially for handheld computing devices, there are two cameras, one on the front side of the device—the same side with a general display screen, and the other one on the back side. One fairly widespread usage of the computing devices is video call, or video conference in some instances, during which both video images and audio signals are transmitted and received. Most likely the video images are captured with the front side camera, allowing a user of the device to see the display on the device and be visible at the same time. Video calls enable the callers to hear and see the other person at the same time. Combined with the mobile capacity of the handheld computing devices, video calls strongly facilitate communication and interaction between the parties.

One drawback of the video call conducted on a computing device, however, is the unpredictable and often far-from-ideal illumination, which renders the video call less attractive or even impossible to proceed. This problem is especially acute for the handheld computing devices. Due to their mobility, video calls conducted with handheld computing devices may be carried out in some locations never been conceived previously. Instead of a nicely illuminated conference room, a user of a handheld computing device may find himself/herself in a car, in a dark room, or in some places with weak or impossible-to-adjust light, making it impossible to show the user's image properly. The current invention addresses this problem by providing an illumination device that may be attached to a computing device and enable a user to have manageable light for his/her video call or video conference. In addition, the illumination device introduced by the current invention may have numerous additional applications that would provide significant convenience and greatly improve the user experience of the computing device.

DESCRIPTION OF THE RELATED ART

U.S. Pat. No. 7,631,979 discloses a universal lighting system for use with a computer web camera including a digital computing device fitted with a web camera for capturing images of a subject for transmission over a worldwide communication network. A base clamping mechanism is affixed to the computing device. A light array is adjustably connected to the base clamping mechanism for illuminating the subject positioned before the web camera. A diffuser lens is flexibly connected to the base clamping mechanism and sealingly positioned over the web camera for diffusing received light for creating a clear image of the illuminated subject prior to transmission over the communication network.

U.S. Pat. No. 7,841,729 discloses an illuminator device for illuminating one or more users in front web camera and a communication terminal having a bulb for emitting light; a reflector operatively associated with the bulb for projecting the emitted light; and an arm disposed between the bulb and the terminal for connection to the terminal are provided. The bulb is positionable relative to the web camera to provide optimal viewing of the user through the web camera. An illuminator device for illuminating one or more users in front of a web camera and a communications terminal having a frame and a screen having a plurality of bulbs, wherein the plurality of bulbs are disposed in the frame of the terminal to provide illumination to the face or faces of the user.

Various apparatus are known in the art, but their structures are distinctively different from the current invention. Moreover, the prior arts fail to address all of the problems solved by the invention described herein. Two embodiments of this invention are illustrated in the accompanying drawings and will be described in more detail herein below.

SUMMARY OF THE INVENTION

The current invention discloses an illumination device to be used with a computing device, especially a handheld computing device. The illumination device comprises: a light source; a power connecter, and an attachment assembly affixing the light source to a computing device. The illumination device disclosed by the current invention would significantly improve the experience of video calls, video conferences, picture-taking, and other camera-related or unrelated activities conducted by a computing device As indicated above, "computing device" used here is a broad concept and it refers to but is not limited to: a desktop computer, a laptop computer, and a handheld computing device such as but not limited to smart phones such as iPhone® or Android® phones, computing tablets such as iPAD®, Personal Data Assistants (PDAs), and other devices that are relatively small and light and are equipped with basic computing and network connecting capabilities. Since the usage of the present invention is more clearly demonstrated on handheld computing devices, the discussions will be focusing on such devices. However, it should be clear that the illumination device disclosed here may also be implemented to desktop and laptop computers and have significant beneficial effects.

With the implementation of front and back cameras, handheld computing devices may be used in ways that could not be conceived before. As indicated above, one of the applications is video call or video conference that allows the users to see and speak to one another at the same time. In most cases, a user is holding the handheld computing device with the front of the handheld computing device, defined as the side having a display screen, facing the user. The front camera, the camera on the same side as the display screen, is thus capable of capturing the image of the user, especially the image of the user's face. Through its networking capacities, the handheld computing device transfers the captured image, as well as audio signals recorded, to the other party/parties engaged in the video call or video conference.

Such a communication experience, however, may be spoiled by weak or improper lighting. When it is too dark, it is very difficult for the front camera to capture a usable image of the user, making a video call less attractive. Moreover, many other camera-related processes and applications conducted with a handheld computing device may have similar requirements for optimized lighting conditions. One simple example is taking a photograph or video recording with the handheld computing device, either of the user himself/herself, or of another person, or of any other scene or subject. When the ambient light is too weak, it may ruin the results of the picture or the video. Another example is the "mirror" application for handheld computing devices, with which a user may see his/her own image in the display. Poor ambient light conditions also harm the usage of such applications.

The current device addresses the problems listed above by attaching a light source, preferably a plurality of light-emitting diodes (LEDs) to the handheld computing device, allowing the light source to illuminate the user, especially the user's face, enabling the front camera or the back camera to capture an optimized image of the user or any other subject and facilitate the video call, the photo or video capturing, the "mirror" application, or any other camera-related experience.

Moreover, with the basic design, there may be numerous variations that would provide different kinds of embodiments of the illumination device to satisfy different needs for applications and users. Some of the applications do not even have to be camera-related because the illumination device disclosed herein may also have signaling capacities besides the functions to provide lighting.

The light source, as suggested, is preferably LED lights. However, the light source may also be other lights such as compact florescent lights (CFL) or electroluminescent light. In particular, electroluminescent light using algae-based wire and panels, such as the light based on RILI technology, may be incorporated as the light source in the current device. In addition, sometimes it is desirable to make the lights adjustable in terms of luminous intensity, viewing angles, and diffusion. The lights may have color either by using color lights or with the addition of a color cover. In general, implementing more adjustability may allow the illumination device to provide lighting for one or more persons and for various purposes. It may also enable the illumination device to flash, to demonstrate different patterns, and therefore satisfy different needs.

There may be an external power source, separate from the power source for the handheld computing device. The external power source may be connected to the lights through a power connector, providing energy needed for the illumination. The external power source may be one or more batteries, such as the regular AAA zinc-carbon or alkaline battery, or any other type or size that may fit the needs in terms of energy needs or physical accommodation. The battery may be disposable or rechargeable, allowing flexibility as to cost-effectiveness and convenience. The battery may be connected to both the illumination device and the handheld computing device, providing energy to both devices, serving as a backup or extra power source to the handheld computing device. On the other hand, it is also possible to simply connect the light source to the handheld computing device and allow the light source to use the power of the handheld computing device, reducing the size and weight of the illumination device and making it more portable.

The illumination device includes an attachment assembly that affixes the light source to the handheld computing device. The attachment is preferred to be non-permanent, so that the lights may be added or removed as the user desires. The attachment assembly may take many forms. For example, it may be a flat case with an indentation to enclose an external power source and power connector, while also having an recess or docking place for the handheld computing device to attach. The current invention encompasses all kinds of attachment assemblies that allow convenient connection between the lights and the handheld computing device. Moreover, the attachment assembly may serve additional purposes such as supporting the handheld computing device in an easy-to-view position, allowing a user of the handheld computing device to watch the device in a hand-free mode. In addition, more complex attachment assembly may include structures that allow the illumination device to be further integrated with the handheld computing device in terms of synergetic control and data sharing.

The illumination device may further comprise an external switch that allows the user to turn the lights on and off. However, it is possible, especially when the illumination device is sufficiently integrated with the handheld computing device, to use the buttons, switches, and menus on the handheld computing device to control the lights.

As indicated above, the illumination device may be used to facilitate video calls or video conferences or to enhance other camera related functions of the handheld computing device. In such a case, the illumination device taught by the current invention may enhance such experiences by providing additional and well-controlled illumination.

In addition, with further connection between the lights and the handheld computing device, the lights of the illumination device may serve as indicators for a handheld computing device's status or as signals for the applications being used on the handheld computing device. For example, the lights may flash or light up when there is an incoming call. Or the lights may change in lighting pattern, luminous intensity, or color when the user is speaking on the handheld computing device or when certain music or game is being played.

Also in the purview of the current invention is a series of computer programs or applications that may be used to control the illumination device. For example, a basic version of such a program would be able to adjust the luminous intensity, viewing angles, lighting pattern, and/or color of the illumination device. A more advanced program would allow the illumination device to synergize with the status of the handheld computing device, such as an incoming phone call. Still another advanced program may integrate the illumination device with another application so that the lights are partially controlled by the application.

In general, the illumination device is designed to be small, portable, versatile, energy efficient, durable, and fully compatible with the handheld computing device, or more generally, the computing device, that is to be used with the illumination device.

In summary, it is an object of the present invention to provide an illumination device that may be attached to a computing device, especially a handheld computing device.

Yet another object of the present invention is to provide an illumination device that may be powered by an external power source.

Still another object of the present invention is to provide an illumination device that may be powered by a power source integral to a handheld computing device to which the illumination device is attached.

Yet another object of the present invention is to provide an illumination device that may be controlled by an external switch.

Still another object of the present invention is to provide an illumination device that may be controlled by buttons, switches, or menus integral to a handheld computing device to which the illumination device is attached.

Yet another object of the present invention is to provide an illumination device that has lights with adjustable intensity, angles, and diffusion.

Still another object of the present invention is to provide an illumination device that provides lights for one person as well as a group of persons.

Yet another object of the present invention is to provide an illumination device that provides illumination to a user of a handheld computing device during a video call or video conference.

Still another object of the present invention is to provide an illumination device that provides lights to a user of a handheld computing device for taking photographs or video for himself/herself, other persons, or other subjects.

Yet another object of the present invention is to provide an illumination device that provides illumination to a user of a handheld computing device when the user sees his/her image displayed on the handheld computing device.

Still another object of the present invention is to provide an illumination device that may light up, flash when there is an incoming call to the handheld computing device to which the illumination device is connected.

Still another object of the present invention is to provide an illumination device that is portable and easy to use.

Still another object of the present invention is to provide an illumination device that may change in lighting pattern, luminous intensity, viewing angles, or color.

Still another object of the present invention is to provide an illumination device that may serve as indicators or signals for a handheld computing device's status or an application on the handheld computing device.

Still another object of the present invention is to provide an illumination device that may light up, flash, or change the luminous intensity, viewing angles, lighting pattern, or color, when the user is speaking or when music or game is being played on the handheld computing device to which the illumination device is connected.

Figure 1:
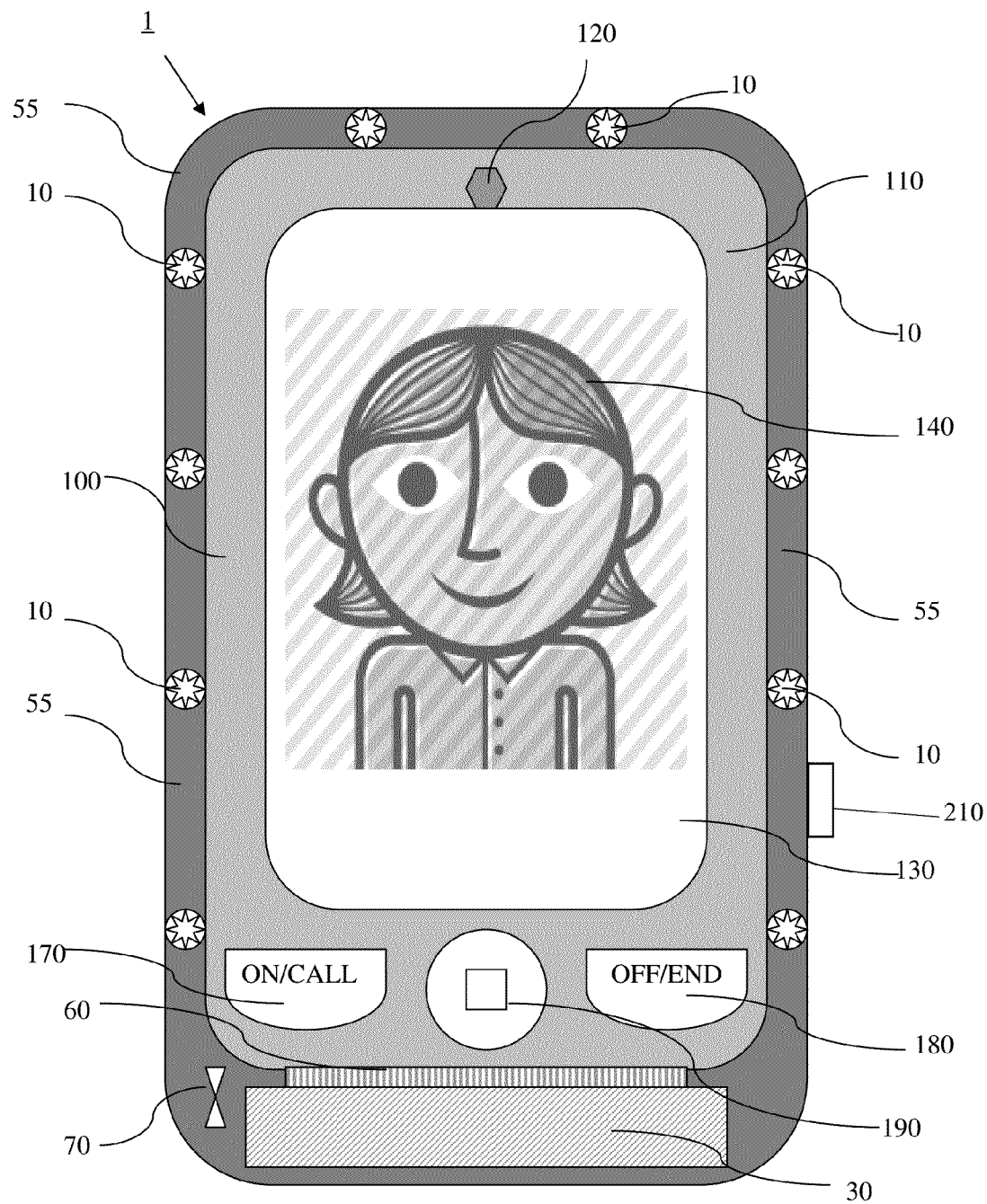
FIG. 1 is an isometric drawing of a front view of a first embodiment of the present invention when an illumination device is connected to a handheld computing device.

DESCRIPTION OF THE PREFERRED
EMBODIMENTS

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 is an isometric drawing of a front view of a first embodiment of the present invention when an illumination device is connected to a handheld computing device. Shown in FIG. 1 are the illumination device 1 attached to the handheld computing device 100, wherein the illumination device 1 comprises an attachment assembly, which comprises a case 55 here, an external power source 40, a dock 60 for the handheld computing device 100, an illumination device switch 70, and a light source comprising a plurality of LEDs 10. For clarity purposes, not all the LEDs are marked in FIG. 1. Shown in FIG. 1 is also the handheld computing device 100 having a display screen 130 defining a front side 110, an ON button 170, an OFF button 180, a MENU switch 190, and a front camera 120. Also shown in FIG. 1 is an image 140 being displayed in the display screen 130.

As indicated above, the handheld computing device 100 is defined broadly. In FIG. 1, the handheld computing device 100 is shown as a smart phone having a display screen 130, an ON button 170, an OFF button 180, and a MENU switch 190. However, it should be clear that the current invention may be used to accommodate any computing device by making certain adjustments to the external power source 40, the case 55 and the dock 60. Moreover, the format and configuration of the handheld computing device 100 may vary significantly due to the brand and version of the device. It is very likely that a handheld computing device 100 does not have any of the buttons or switches shown in FIG. 1. Nevertheless, it should be clear that the current invention provides an illumination device 1 that may accommodate all kinds of computing devices, especially handheld computing devices.

The image 140 here in FIG. 1 is shown to demonstrate possible display on the screen when the handheld computing device is in use. The image 140 may be the image of a party engaged in a video call or video conference with the user of the handheld computing device. The image 140 may also be the image of the user of the handheld computing device when a photograph or video is being captured by the front camera. When it is the image of the user of the handheld computing device, the user may view the image and adjust the luminous intensity, viewing angles, color, and lighting pattern of the light source to achieve optimized result. The user may also adjust the distance from the handheld computing device 100. The illumination of user with the device will work best when the proper distance from camera to user is achieved. The image 140 may also be the image of any person or subject being captured by a camera other than the front camera. Furthermore, the image 140 may also serve as an illustration of any picture or image that are displayed on the screen 130.

The LEDs 10, as shown in FIG. 1, are the preferred type of light source. As indicated above, it is still possible to use other kinds of light, such as CFL or electroluminescent light, as the light source. The basic features of the LEDs may vary according the specific needs of the user and the specific usage for the illumination device 1. For example, the LEDs' luminous intensity, viewing angle, and color may be different from model to model. It is possible to use LED emitting white light or color lights. It is also possible to use color covers or films to enable a white-light LED to show color. Preferably, a plurality of LEDs are used as the light source, as shown in FIG. 1. However, it is possible to use only one light. The LEDs may be controlled individually or as a whole regarding switching them on or off, or regarding the luminous intensity, viewing angle, and color of the LEDs. Alternatively, the LEDs may be arranged into subsections that may be controlled as individual subsections. For example, as in FIG. 1, the LEDs may be arranged into three subsections: the left four LEDs, the right four LEDs, and the top two LEDs. As a user of the handheld computing device 100 desires, he/she may choose to turn on and off any subsection or change the features of any subsection according to the ambient light conditions, the posture of the user, and/or the application or process involved.

The LEDs may have different technical specifications and dimensions. In general, the LEDs should be small and match the handheld computing device 100 and the intended usage. Standard T1 LEDs, T1-¾ LEDs, various kinds of surface mount LEDs, miniature LEDs, mid-range LEDs, high-power LEDs, LED panels, LED modules, and other kinds of LEDs may all be possible choices for specific uses. Some special types of LEDs may be used for special effects. For example, single wave length LEDs may be used to light therapy. In general, the LEDs may use electricity ranging from 0.1 mW to 50 W, with current ranging from 0.1 uA to 1 A and voltage ranging from 0.1 mV to 250 V. The LEDs 10 may emit white light or color light with particular wavelengths. In a preferred embodiment, the LEDs emit light of warm color temperature, ie. 2400 Kelvin.

The external power source 40 here in FIG. 1 is not an indispensible component of the illumination device 1. In some situations it is preferable to have an external power source 40 as shown in FIG. 1. However, in other situations, having no external power source presents different advantages. For example, when the illumination device 1 is equipped with a connector to the internal power source of the handheld computing device 100, it is possible for the illumination device 1 to share the power source with the handheld computing device 100, making the structure of the illumination device 1 less complicated and easier to control. However, when it is desirable to have a long battery life or to have a changeable illumination device 1 that may fit different kinds of handheld computing device 100, it is probably advantageous to have an external power source, like the external power source 40 shown in FIG. 1, because the power connector may not fit with all the different handheld computing devices.

In FIG. 1, the external power source 40 may be a battery. However, it may well be other kinds of power sources as long as the light source is provided with energy. If a battery is used, the external power source 40 may be a disposable battery or a rechargeable battery, addressing different concerns such as cost and convenience. In terms of chemical composition, many kinds of batteries may be used. The types of batteries to be used as the external power source 40 include but are not limited to: zinc-carbon batteries, alkaline batteries, aluminum batteries, dry-cell batteries, lead-acid batteries, lithium batteries, nickel batteries, potassium batteries, and sodium-ion batteries.

The external power source 40 is designed to provide power to the LEDs 10. When the voltage or current provided by the external power source 40 is insufficient to power the LEDs 10, it is possible to include a regulator circuit, such as a buck-boost converter, to enhance the output from the power source and ensure that the LEDs 10 are adequately supplied. Such regulator circuits are well-known in the arts. In addition, the illumination device 1 may further comprise a battery meter that measures the battery life and informs the user to change batteries when necessary. The technology for such battery meter is also well known in the arts.

In addition to providing power to the LEDs 10, the external power source 40 may serve as a backup power source to the handheld computing device 100. With proper connections between the handheld computing device 100 and the illumination device 1, both in terms of control circuitry and electricity connections, it is possible that the external power source 40 may be used to directly provide energy to the handheld computing device 100, enabling a longer overall battery life and providing more flexibility. When the external power source 40 is rechargeable, the handheld computer device 100 may also be recharged, enabling a convenient solution for supplying power to both the illumination device 1 and the handheld computing device 100.

It should be noted that FIG. 1 is only supposed to be illustrative as to the position and arrangement of the case 55 and the external power source 40. The external power source 40 may be located at other positions. For example, the external power source 40 may be shield in a chamber attached to the back of the case 55.

In FIG. 1, an illumination device switch 70 is also shown. Such an external switch, as an external power source 40, is not an indispensible part of the illumination device 1. If the illumination device 1 is sufficiently integrated with the handheld computing device 100, it is possible to control all aspects of the LEDs through the buttons, menus, and switches of the handheld computing device 100. Such a design may also provide a full spectrum of options as to the individual, sub-sectional, or whole group of LEDs' luminous intensity, viewing angle, color, and lighting patterns. However, in certain situations, having an external switch may be desirable because it affords a quick and easily accessible control for the lights.

It should be noted that the switch 70 may have different designs to accommodate different needs. The switch 70 may be mechanical, electrical or logical. In its most simple form, switch 70 may turn on and off all the LEDs without any other adjusting capacities. However, switch 70 may also be designed as a dimmer that dictates the brightness, or luminous intensity of the LEDs in a certain range. One possible design is that the switch 70 may control mechanical means of adjustment such as articulating lens or lenses covering the LEDs 10, allowing for change of illumination intensity. To enable the switch 70 to perform such a function, some well know circuits such as a potentiometer may be included in the illumination device. Moreover, switch 70 may have a more complex design to control the individual, sub-sectional, or whole group of LEDs' luminous intensity, viewing angle, color, and lighting patterns.

The current invention discloses an attachment assembly that affixes a light source to a computing device. In the embodiment shown in FIG. 1, while the computing device is a handheld computing device 100, the attachment assembly is a case 55 having a recess that partially encases the handheld computing device 100, leaving the front side 110 largely exposed so that the display screen 130 may be viewed clearly and the front camera 120 may be unblocked. The handheld computing device 100 is snapped in the recess of the case 55. The LEDs are mounted on the edges of the case 55 to direct light from the LEDs in a generally perpendicular direction to the front side 110 of the handheld computing device 100.

The case 55 may be a one-piece structure or have a multi-piece design for more flexibility and convenience. In addition to attaching the light source to the handheld computing device 100, the case 55 may also provide physical and hygienic protection to the handheld computing device 100, preventing it from damages due to physical impact. The case 55 may be made from materials such as but not limited to: rubber, leather, metal sheet or foil, or plastic such as, but not limited to, polyethylene terephthalate (PET), polyethylene (PE), high-density polyethylene, polyvinyl chloride (PVC), polyvinylidene chloride (PVDC), low-density polyethylene (LDPE), polypropylene (PP), polystyrene (PS), high impact polystyrene (HIPS) and polycarbonate (PC), or some combination thereof. The case 55 may be made of one kind of materials, or different parts of the case 55 may be made of different materials, ensuring optimized protection and feel.

It should be noted that the "snap-in" design is not the only form of attachment to connect the handheld computing device 100 to the case 55. For example, the case 55 may comprise two pieces of cover, either or both may be slidably connected to the handheld computing device 100. It is also possible that the handheld computing device 100 may be fastened to the case with other means such as pre-positions screws, hook-and-loop fastener, riveting, or any other kind of mechanisms allowing a secure attachment. Preferably, the case 55 is removeably attached to the handheld computing device 100, allowing easy detaching for higher level of flexibility. However, it would also be acceptable to make the case 55 a permanent fixture of the handheld computing device 100, allowing high level of integration between the handheld computing device 100 and the illumination device 1.

The LEDs 10 may be mounted to the case 55 by any means that allow secure attachment. The LEDs 10 may be welded, screwed, riveted, glued, co-molded, or in any other way linked to or inserted into the case 55. Necessary structures, such as prepositioned magnets or hook-and-loop fasteners, or snaps, may be employed to fasten the LEDs to the case 55. In general, the LEDs may be connected to the case 55 in a permanent or removable manner. Moreover, the approach to connect the LEDs to the case may vary due to the type of LEDs or the type of cases used.

After attachment, the relative positions and the projection angles of the LEDs may still be adjustable, allowing more flexibility as to the area, scope, and depth of illumination. Moreover, the attachment method for the LEDs may be designed in such a way that allows the LEDs to illuminate to a direction not generally perpendicular to the front side the handheld computing device. For example, each LEDs may be mounted on the case with a universal wheel 210 that allows the LED to tilt to all directions. Thus, when it is desirable to use the LEDs with the back camera of the handheld computing device, such designs may allow the LEDs to illuminate in the direction of the back camera.

As indicated above, the attachment assembly may take other forms apart from a case 55. The key is to enable the attachment assembly to attach the light source to the handheld computing device. In the simplest format, the light source may be mounted directly on the handheld computing device, making the light source integral to the handheld computing device. In that case, the attachment assembly may simply comprise the minimum material or structure, such as the magnet, glue, screw, rivet, or welding material, that connects the light source to the handheld computing device. In a more complex form, the attachment assembly may comprise simply of one or more attachment strips that have the LEDs mounted on the strips and these strips may be attached to the handheld computing device through any means possible. The strips may be connected to the handheld computing device with screws or hinges, allowing the strips to tilt away from the handheld computing device while maintaining the attachment, enabling the LEDs to illuminate a wider area. When necessary, the LEDs may even be removed from the handheld computing device and the attachment assembly may comprise an extension cord that allow the LEDs to be powered, controlled, and provide illumination to an extended area. Such a design may be helpful to maximize the illumination scope of the illumination device.

The illumination device 1 may further comprise a sensor that detects and measures ambient light conditions. The general structure and circuitry for such sensor is well known in the arts. An ambient light sensor may facilitate the adjustment process for the luminous intensity, viewing angle, color, and lighting pattern of the handheld computing device, making it possible for automatic control when an applicable computer program is installed.

Figure 2:
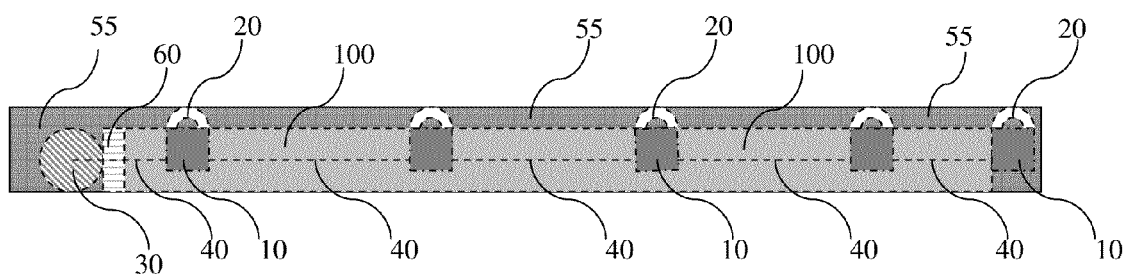
FIG. 2 is an isometric drawing of a side view of the first embodiment of the present invention when an illumination device is connected to a handheld computing device.

FIG. 2 is an isometric drawing of a side view of the first embodiment of the present invention when an illumination device is connected to a handheld computing device. To make the various elements visible, dotted lines are used to illustrate structures that are shielded from view by the case 55. Shown in FIG. 2 is the illumination device 1 having a case 55, a power source 30, a dock 70, a plurality of LEDs 10 covered by light covers 20, and power connector 40 connecting the LEDs 10 to the power source 30. Also shown in FIG. 2 is the handheld computing device 100 being encased in the case 55. For clarity purposes, not all the LEDs or light covers are marked in FIG. 2.

The power connector 40 represents a means to connect the LEDs 10 to a power source, such as the power source 30 shown in FIG. 2. As indicated above, the power source 30 may be a battery or any other kind of power source that is compact and safe. The power connector 40 may be regular electric wiring that is well-known in the arts or any other kinds of circuitry that may be used to connect a light source to a power supply.

The dock 70 may be considered a part of the attachment assembly, together with the case. Like the power connector 40, the dock 70 is not an indispensible structure of the illumination device. However, the dock 70 may play some important roles if it is present. The dock 70 may serve as part of the "snap-in" structure that secures the handheld computing device 100 in the case 55. More importantly, the dock 70 may include connectors that may be plugged into the handheld computing device 100 and serve to integrate the illumination device 1 with the handheld computing device in terms of data sharing, synergistic control, and sharing of power sources. The technology to enable the dock 70 to serve as a connector to the handheld computing device 100 is well known in the arts.

The light covers 20 may be a lens used to diffuse the light from the LEDs 10, focus the lights from the LEDs 10, and/or add certain colors when the LED light is white. The light cover 20 may diffuse and soften the light from the LEDs 10 and help to achieve optimal illumination without creating a blind effect.

The light cover 20 may be any kind of diffuser, such as but not limited to: polycarbonate LED diffuser, acrylic LED diffuser, clear LED diffuser, opal LED diffuser, satin LED diffuser, LED diffuser films, or any product or material having LED light diffusing capability. The light covers 20 may also be any kind of lens that is adjustable or unadjustable. The light covers 20 may be colored, changing white light emitted by the LEDs to color lights.

The light covers 20 may be attached to the LEDs or to the case. The manner of attachment may vary according to the materials used and the specific configuration of the different structures. The light covers 20 may be slidable or rolling covers that may be attached or detached easily. The light covers 20 also be glued, screwed, welded, or riveted to the LEDs or the attachment assembly.

The configuration of the light covers 20 may differ from what is shown in FIG. 2. For example, the light covers 20 may take the form of "light strip" or a "light pipe," which may cover more than one LED light. In particular, one "light pipe" may cover the left four LEDs, another one for the right four LEDs, and another for the two LEDs on top, enabling better diffusion and better illumination. Alternatively, a continuous "light strip" or "light pipe" may cover all the LED lights.

Figure 3:
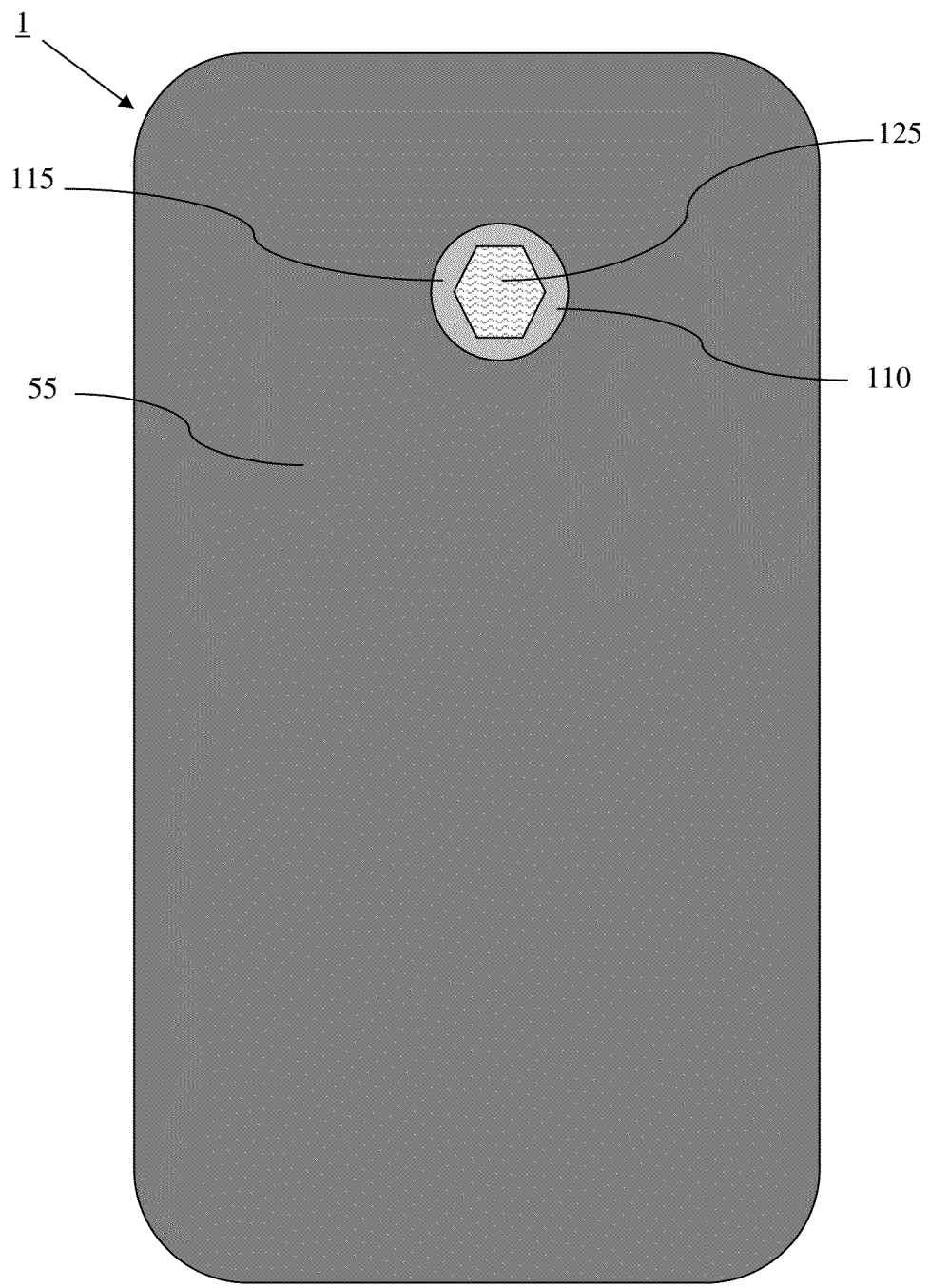
FIG. 3 is an isometric drawing of a back view of the first embodiment of the present invention when an illumination device is connected to a handheld computing device.

FIG. 3 is an isometric drawing of a back view of the first embodiment of the present invention when an illumination device is connected to a handheld computing device. Shown in FIG. 3 are the case 55, the LEDs 10, and the handheld computing device 100 having a back side 115 and a back camera 125 on the back side 115.

As indicated above, the attachment assembly may take many forms. The case 55 here is one example that allows both light source attachment and general protection to the handheld computing device. Certain methods to mount the light source to the case may allow the light source, preferably LEDs 10, to be adjustable in position and used with the back camera 125. In such circumstances, the LEDs 10 may assist the photo or video capturing process or other applications conducted with the back camera.

The attachment assembly may also comprise other structures that may be combined with the case 55. One possible addition is a hand-free structure such as but not limited to a frame stand and/or a hanger. The frame stand or hanger is preferably foldable and may attach to the back of the case 55, occupying little space with folded. When the frame stand or hanger is unfolded, it may support or hang the handheld computing device in an upright position, allowing the display to be viewed comfortably by a user without occupying a user's hand. More particularly, the side(s) and bottom edge of the case may be able to be made with an angled surface so that the case may serve as part of a stand. For example, the thicker bottom area in a case, adjacent to where the external battery is installed, may provide enough surface to support an Iphone® at an angle. In summary, the frame stand or hanger enables hand-free viewing of the handheld computing device, providing more flexibility as to what can be done with the device.

Figure 4:
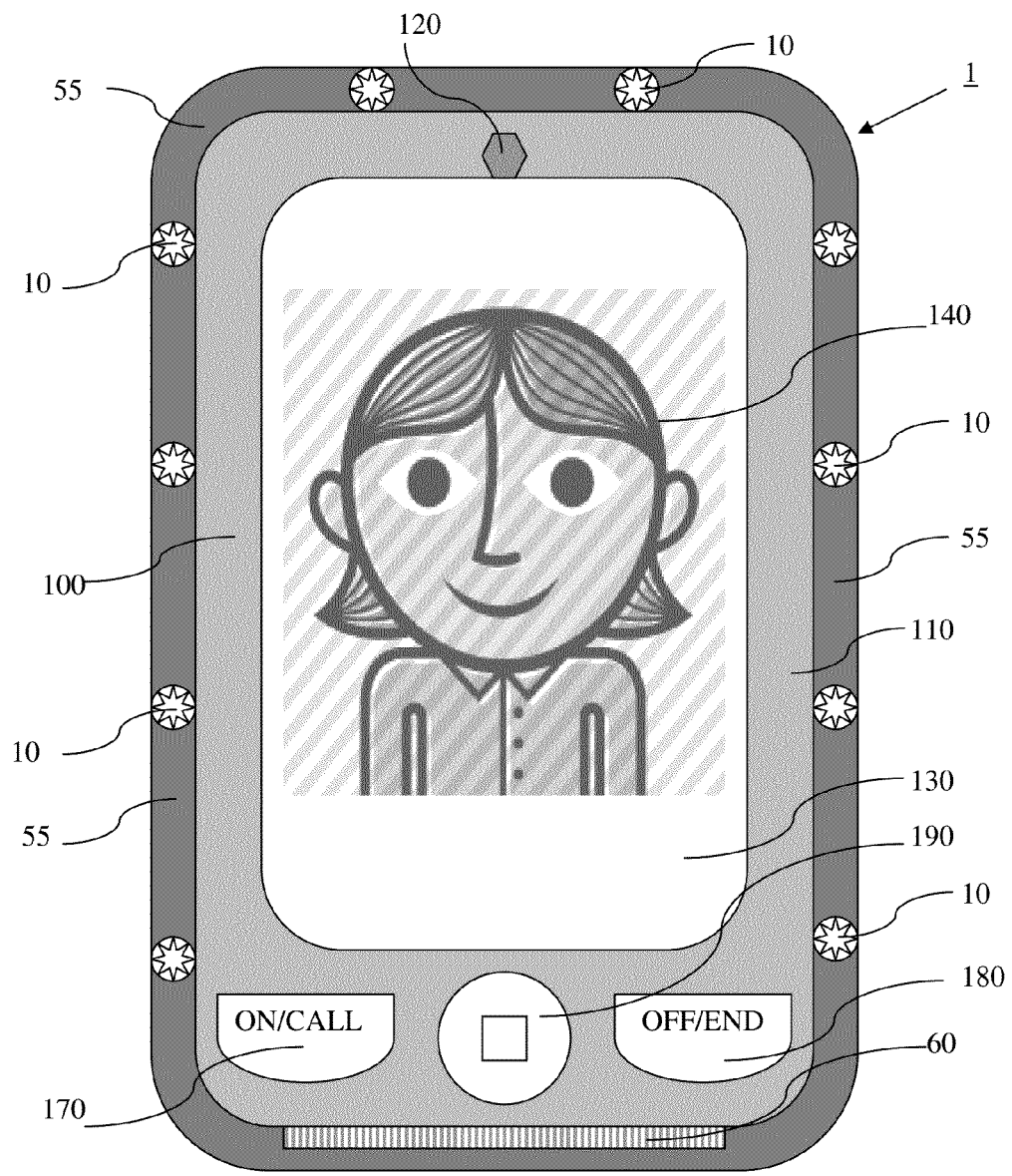
FIG. 4 is an isometric drawing of a front view of a second embodiment of the present invention when an illumination device is connected to a handheld computing device.

FIG. 4 is an isometric drawing of a front view of a second embodiment of the present invention when an illumination device is connected to a handheld computing device. Shown in FIG. 4 are the illumination device 1 attached to a handheld computing device 100, wherein the illumination device 1 comprises an attachment assembly, which comprises a case 55 and a dock 60, and a plurality of LEDs 10. For clarity purposes, not all the LEDs are marked in FIG. 4. Shown in FIG. 4 is also the handheld computing device 100 having a display screen 130 defining a front side 110, an ON button 170, an OFF button 180, a MENU switch 190, and a front camera 120. Also shown in FIG. 4 is an image 140 being displayed in the display screen 130.

Figure 5:
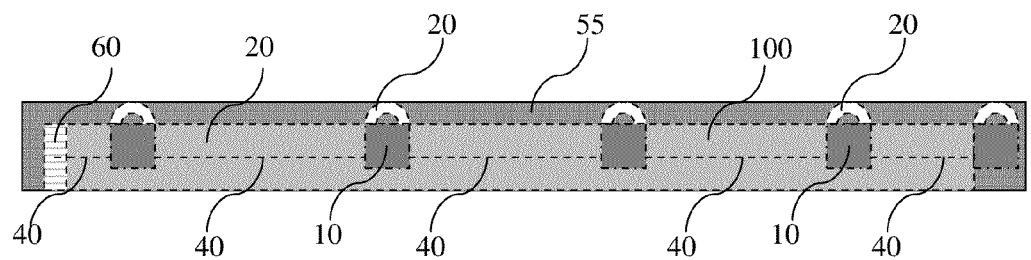
FIG. 5 is an isometric drawing of a side view of the second embodiment of the present invention when an illumination device is connected to a handheld computing device.

FIG. 5 is an isometric drawing of a side view of the second embodiment of the present invention when an illumination device is connected to a handheld computing device. To make the various elements visible, dotted lines are used to illustrate structures that are shielded from view by the case 55. Shown in FIG. 5 is the illumination device 1 having a case 55 and a dock 70, a plurality of LEDs 10 covered by light covers 20, and a power connector 40. Also shown in FIG. 5 is the handheld computing device 100 being encased in the case 55. For clarity purposes, not all the LEDs or light covers are marked in FIG. 5.

FIG. 4 and FIG. 5 illustrate a second embodiment of the current invention. In this embodiment, the external power source and the switch shown in FIG. 1-2 are no longer present. The light source, here a plurality of LEDs, is connected by the power connector 40 to the internal power source of the handheld computing device 100. Moreover, with further integration of the illumination device 1 and the handheld computing device 100, the luminous intensity, viewing angle, color, and light pattern of the light source may be adjusted by the switches, buttons, and menus of the handheld computing device, eliminating the need for an external control switch. Such a design simplifies the basic structure of the illumination device 1, yet requiring higher level of connection and synergy between the illumination device 1 and the handheld computing device.

It should be noted that the second and third embodiments may not necessarily be described to the fullest extent because such descriptions are provided for the first embodiment. In particular, the description for any of the embodiments should be considered included other embodiments as long as there is not conflict between the descriptions.

Figure 6:
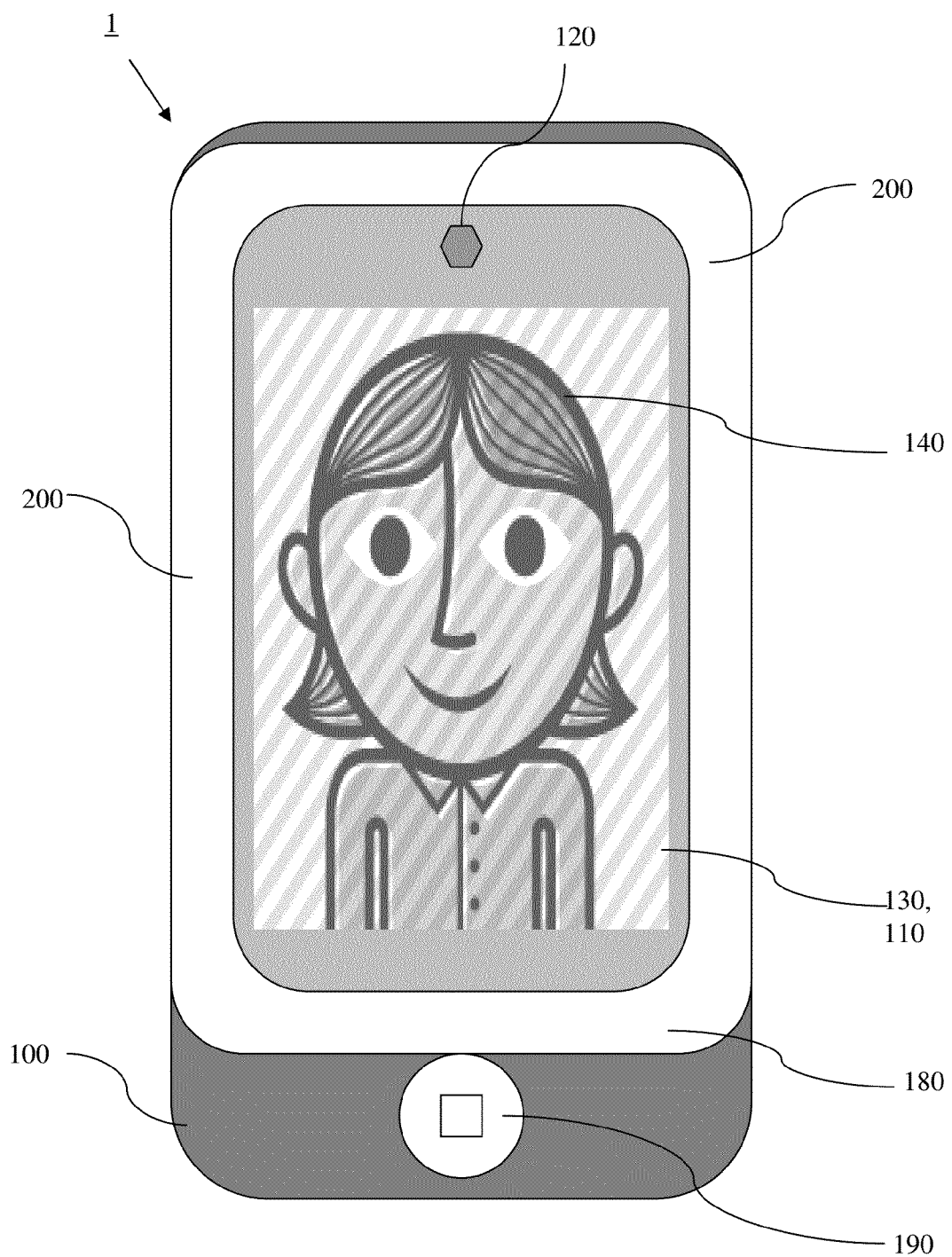
FIG. 6 is an isometric drawing of a front view of a third embodiment of the present invention when an illumination device is connected to a handheld computing device.

FIG. 6 is an isometric drawing of a front view of a third embodiment of the present invention when an illumination device is connected to a handheld computing device. Shown in FIG. 1 are the illumination device 1 attached to the handheld computing device 100, wherein the illumination device 1 comprises a light source comprising a circular light panel 200 encircling a display screen 130. Shown in FIG. 1 is also the handheld computing device 100 having a display screen 130 defining a front side 110, a MENU switch 190, and the front camera 120. Also shown in FIG. 1 is an image 140 being displayed in the display screen 130.

In the third embodiment, some other features such as the attachment assembly, the external power source 40, the dock 60, and the illumination device switch 70 are not displayed. However, it should be noted that these structures may still be present, but shielded from direct view. As indicated above, electroluminescent light using algae-based wire and panels, such as the light based on RiLi technology (produced by Revolution in Lighting, Inc.), may be used as the light source. The design of the circular light panel 200 is particularly suitable to use such lighting technology, which is in general energy efficient, long lasting, bright, and having a wide viewing angle. The circular light panel 200 is preferably thin and may attach to the handheld computing device 200 using an attachment assembly comprising any kind of connecting mechanism, such as industrial glue. It should also be noted that the design, size, and shape of the light panel 200 may vary according to functional and/or aesthetic needs. The power supply, the control system, and the possible varying display of lighting by the light source are fully described above and below.

As indicated above, it is in the purview of the current invention that a series of computer applications or programs may accompany the illumination device disclosed herein. These applications may facilitate the use of the illumination device and ensure that it is safe, well-controlled, and optimized to assist the use of some other applications.

For example, when the illumination device is sufficiently connected and synergized with the computing device, a program may be used to specifically control the light source of the illumination device to adjust the luminous intensity, viewing angle, color, and lighting pattern of the light source. A user of a handheld computing device may turn on the illumination device simply to provide general illumination. A handheld computing device, in such situations, may be used as a flashlight in a dark place. When the illumination device is equipped with an ambient light sensor, as indicated above, it is possible to have a program that automatically adjusts the luminous intensity of the light source based on ambient light conditions.

Another example is a video call program that specifically integrates the usage of the illumination device. Before the user transmits his/her image, he/she may view the image on the display screen to obtain optimal results. The program may control both the camera and the illumination device, allowing easy adjustment without switch to another program that controls the camera. The program may facilitate this process by setting certain criteria that help the user to optimize the image. For instance, the program may display on the screen a dotted-line contour of a generic human face, while the user of the handheld computing device may adjust the distance of his/her face to the device and/or the zoom and focus of the front camera to make the image of his/her face to fit the dotted-line contour, achieving optimal results. A slight variation of this design is to display a generic eye contour that allows the user to make adjustment to match his/her image to the contour. Or the program may directly show suggestions or recommendations on the display screen to urge the user to turn the illumination device on, make it brighter or dim it, or to adjust the zoom and/or focus of the camera for optimal image. In essence, the illumination intensity may be adjusted according to the optimal focal length of the camera. Such a basic design should also be applicable to other programs. Similarly, a photo or video capturing program having the same features may be installed to assist the use of the illumination device. The photo or video capturing program may aid the user in adjusting the illumination device to obtain the best result as to picture quality.

Another example is a "makeup mirror" application that integrates the illumination device with the front camera. In some cases, a user of a handheld computing device would like to see his/her own image to be captured by the front camera and be displayed on the display screen simultaneously. The user then would be able to assess his/her appearance and make necessary adjustments. To achieve optimal results, the "makeup mirror" application would allow the user to control the luminous intensity, viewing angle, color, and lighting pattern of the light source in the illumination device, or such features may be adjusted automatically by the application when the ambient light sensor is included and used. Combined with the frame stand or hanger structure that may be a part of the attachment assembly, the user may set the handheld computing device in an upright position without actually holding the device, freeing up both of the user's hands for optimal maneuvering, while the whole process is being conducted under ideal illumination.

Also indicated as above, the illumination device may serve as indicator or signaling source for the status of the handheld computing device. For example, when there is an incoming call to a small phone, a handheld computing device, the light source of the illumination device may light up or change the luminous intensity, viewing angle, color, and/or lighting pattern of the lights. The lights may flash or subsections of the lights are turned on rotationally. A more complex set up may allow the user of the smart phone to establish and manage specific profiles—specific combination of luminous intensity, viewing angle, color, and/or lighting pattern—for the illumination device. The user may choose different profiles to match different callers. Such an application controls the illumination device in somewhat similar ways as ring tones are managed for smart phones, further enriching the user experience.

Furthermore, since the illumination device may be used as signals for the computing device to which the illumination device is connected, it is possible that the illumination device may be integrated with other program or application being used by the computing device. For example, it is possible to set up the illumination device that when a certain game is being played, the illumination device is turned on and the luminous intensity, viewing angle, color, and/or lighting pattern of the lights change with the progress of the game. A similar implementation is also possible for music. Certain light profiles may be integrated with the music program on the computing device, allowing the lights to flash rhythmically, for example, when the music is being played.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. An illumination device attached to a computing device, comprising:
    a plurality of light sources operably coupled to one another,
        wherein an operative state of the plurality of light sources is controlled by a switch, and
        wherein each of the plurality of light sources is capable of being independently controlled by the switch;
    an attachment assembly comprising a unitary case capable of removably coupling the plurality of light sources to the computing device,
        wherein the unitary case has a recess sized to receive the computing device therein, and
        wherein the attachment assembly is disposed wholly along a periphery of the computing device;
    an external power source operably coupled to the plurality of light sources; and
    a plurality of light covers with at least one of the plurality of light covers being capable of covering or uncovering each of the plurality of light sources,
        wherein the plurality of light covers modify an appearance of light emanating from the plurality of LEDs.

2. The illumination device as claim 1, wherein the plurality of light sources is a plurality of light-emitting diodes (LEDs).

3. The illumination device as claim 2, wherein the LEDs emit lights having a luminous intensity and the luminous intensity is adjustable.

4. The illumination device as claim 3, further comprising a switch to adjust the viewing angle of the LEDs.

5. The illumination device as claim 2, wherein the LEDs emit light having adjustable viewing angle.

6. The illumination device as claim 1, further comprising a power connector,
    wherein the power connector connects the plurality of light sources to a power source integral to the computing device.

7. The illumination device as claim 1, wherein the external power source is a battery.

8. The illumination device as claim 1, wherein the light source is connected to the computing device so that the light source is controlled by a switch integral to the computing device.

9. The illumination device as claim 8, wherein the switch integral to the computing device is capable of adjusting the viewing angle of the LEDs.

10. The illumination device as claim 1, further comprising an ambient light sensor, wherein the light sensor is disposed on the attachment assembly.

11. The illumination device as claim 10, wherein the ambient light sensor is used to detect and measure ambient light and viewing angle of the light source is adjusted according to the measurement of the ambient light sensor.

12. The illumination device as claim 1, further comprising a computing device dock, wherein the dock is connected to the unitary case and the computing device is connected to the dock.

13. The illumination device as claim 12, wherein the computing device has a display screen defining a front side and a front camera on the front side, wherein the LEDs may emit light to illuminate a user of the computing device when the user is in proximity of the front camera.

14. The illumination device as claim 13, wherein the illumination device illuminates a user when a video call is being conducted with the computing device.

15. The illumination device as claim 14, wherein the user of the computing device has a face and the user may see an image captured by the front camera on the display screen of the computing device, wherein the illumination device is used to illuminate the face of the user.

16. The illumination device as claim 15, wherein the computing device is used to initiate or receive calls, the LEDs light up or flash when there is an incoming call or when a call is being made.

17. The illumination device of claim 1, wherein the light source is a light panel emitting electroluminescent light.

18. The illumination device of claim 17, wherein the electroluminescent light uses algae-based materials.

19. The illumination device of claim 18, wherein the light panel encircles a front screen of the handheld computing device.

20. The illumination device of claim 1 wherein the attachment assembly is a snap in attachment assembly.

21. The illumination device of claim 20 wherein the snap in attachment assembly is capable of being readily removed from and applied to the computing device.

22. An illumination device attached to a computing device, comprising:
- a plurality of light sources operably coupled to one another,
  - wherein an operative state of the plurality of light sources is controlled by a switch, and
  - wherein each of the plurality of light sources is capable of being independently controlled by the switch;
- an attachment assembly comprising a unitary case capable of removably coupling the plurality of light sources to the computing device,
  - wherein the unitary case has a recess sized to receive the computing device therein, and
  - wherein the attachment assembly is disposed wholly along a periphery of the computing device;
- an external power source operably coupled to the plurality of light sources;
- an ambient light sensor disposed on the attachment assembly
- a wheel disposed on the attachment assembly; and
- a plurality of light covers with at least one of the plurality of light covers being capable of covering or uncovering each of the plurality of light sources,
  - wherein the plurality of light covers modify an appearance of light emanating from the plurality of LEDs.

23. The illumination device of claim 22 wherein the plurality of light covers diffuse light from the LEDs.

24. The illumination device of claim 22 wherein the wheel enables rotation of at least one of the plurality of LEDs.

25. The illumination device of claim 22 wherein the plurality of light sources are surface mounted LEDs.

26. The illumination device of claim 22 wherein the computing device is a mobile computing device.

27. The illumination device of claim 26 wherein the mobile computing device is a cellular phone or tablet.

28. The illumination device of claim 25 wherein the surface mounted LEDs are strip mounted surface LEDs.

29. The illumination device of claim 22 wherein the plurality of light covers diffuses light from the LEDs.

30. An illumination device attached to a mobile computing device, comprising:
- a plurality of surface mounted light emitting diodes operably coupled to one another,
  - wherein an operative state of the plurality of surface mounted light emitting diodes is controlled by a switch, and
  - wherein each of the plurality of surface mounted light emitting diodes is capable of being independently controlled by the switch;
- a snap in attachment assembly comprising a unitary case capable of removably coupling the plurality of light sources to the mobile computing device,
  - wherein the unitary case has a recess sized to receive the computing device therein, and
  - wherein the snap in attachment assembly is disposed wholly along a periphery of the computing device;
- an external power source operably coupled to the plurality of light sources;
- an ambient light sensor disposed on the attachment assembly;
- a rotatable wheel disposed on the attachment assembly,
  - wherein the rotatable wheel is capable of causing rotation of the plurality of surface mounted light emitting diodes when rotated; and
- a plurality of light covers with at least one of the plurality of light covers being capable of covering or uncovering each of the plurality of light sources,
  - wherein the plurality of light covers modify an appearance of light emanating from the plurality of LEDs by diffusing the light.

* * * * *